Aug. 3, 1965       G. H. SIMMONS       3,199,075

SIGNAL CONTROLLED ADJUSTABLE REAR VIEW MIRROR

Filed Nov. 13, 1961       2 Sheets-Sheet 1

INVENTOR
GEORGE H. SIMMONS
BY
ATTORNEY

Aug. 3, 1965   G. H. SIMMONS   3,199,075
SIGNAL CONTROLLED ADJUSTABLE REAR VIEW MIRROR
Filed Nov. 13, 1961   2 Sheets-Sheet 2
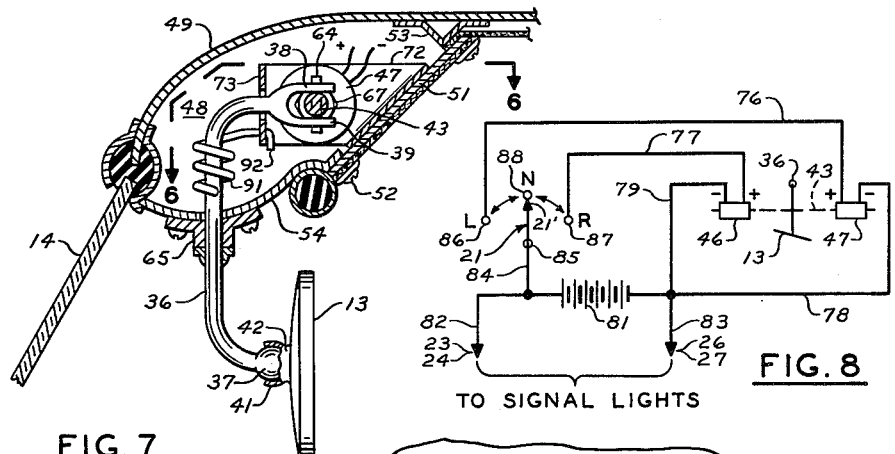
FIG. 7
FIG. 8
TO SIGNAL LIGHTS
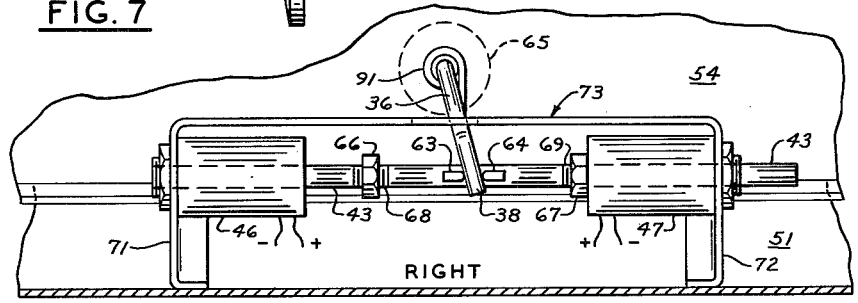
FIG. 6
RIGHT
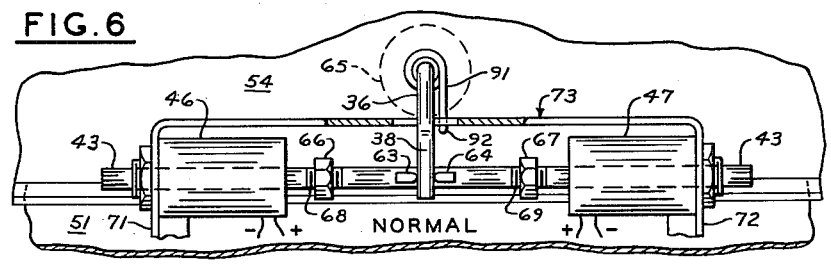
FIG. 4
NORMAL
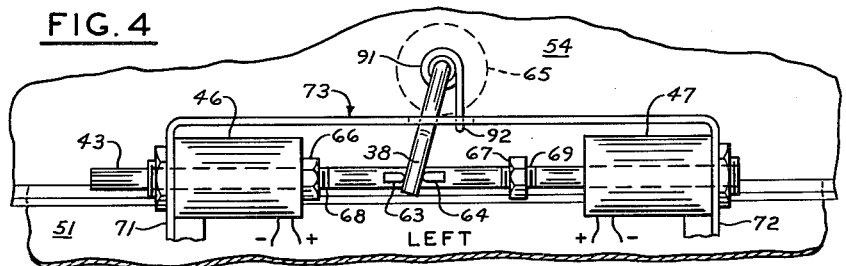
FIG. 5
LEFT
INVENTOR
GEORGE H. SIMMONS
BY
ATTORNEY

United States Patent Office 3,199,075
Patented Aug. 3, 1965

3,199,075
SIGNAL CONTROLLED ADJUSTABLE
REAR VIEW MIRROR
George H. Simmons, 20 Mill Wood Road,
Mill Valley, Calif.
Filed Nov. 13, 1961, Ser. No. 151,698
2 Claims. (Cl. 340—98)

The invention, in general, relates to the transport art and more particularly relates to means for effecting the varying of areas of vision for the operation of a vehicle.

While my improvement is entirely suitable for application to all types of vehicles, whether operable on land or sea or in the air and whether self-propelled or otherwise driven, I have illustrated herein and shall hereinafter describe my invention as adapted to the automotive art solely for purposes of explanation and brevity. And while I shall, likewise for simplicity of explanation and brevity, describe the invention with relation to the variations of areas of vision to the left rear and right rear of the vehicle operator, it is nevertheless within the purview of my present improvement that areas above and below a vehicle, such as an air transport, can be enlarged or varied for the operator thereof.

Those who operate automotive vehicles constantly experience increasing difficulty in detecting the presence of oncoming vehicles from the right rear and left rear especially for the few seconds just prior to and during the making of either a turn to the left or a turn to the right from one highway lane to another and return when maneuvering to pass and upon passing a moving vehicle in the same lane. The present invention is directed to obviating the foregoing and other disadvantages inherent in the maneuvering of a vehicle, as aforesaid, and provides an improved semi-automatic mechanism which affords maximum safety to operators of automobiles and other vehicles when making such turns as well as affording appreciably increased rear vision under such circumstances.

A primary object of the present invention is to provide a signal controlled adjustable rear view mirror for vehicles which automatically move in response to operator-initiated directional signals upon change of direction of the vehicle.

Another important object of my invention is to provide a signal controlled adjustable rear view mirror of the above indicated nature which is additionally characterized by its capacity of automatically varying the vision to accommodate for and to respond to corresponding variances in driving or operating maneuvers of the vehicle.

A still further object of my present invention is to provide, as a new safety factor for vehicle operation, a signal controlled adjustable rear view mirror of the aforementioned character which reduces to a minimum the likelihood of rear end as well as side collisions with their attendant property damages and personal injury.

An additional object of the invention is to provide a signal controlled adjustable rear view mirror for vehicles which is independently adjustable manually for operation automatically between adjustably set extreme positions of movement.

Other objects of my invention, together with some of the advantageous features thereof, will appear from the following description of a preferred embodiment of the invention which is illustrated in the accompanying drawings, as adapted to automotive vehicles. It is to be understood, however, that I am not to be limited to the precise embodiment shown, nor to the precise arrangement of the component parts thereof, as my invention, as defined in the appended claims, can be embodied in a plurality of forms.

Referring to the drawings:

FIG. 4 is a plan view, partly in section, of a preferred embodiment of the invention with component parts of the preferred embodiment of my invention and the rear view mirror in normal position, or as shown in FIG. 1.

FIG. 5 is a view similar to FIG. 4 but with the component parts and rear view mirror in an automatically adjusted position when the vehicle has or is maneuvered for a left turn.

FIG. 6 is another view similar to FIGS. 4 and 5 but with the component parts of the preferred embodiment of my invention and the vehicle's rear view mirror in an adjusted position when the vehicle has or is maneuvered for a right turn, this view being taken on the line 6—6 of FIG. 7.

FIG. 7 is a fragmentary sectional elevational view of a preferred embodiment of the present invention installed just below the roof of a vehicle at the front thereof.

FIG. 8 is a schematic wiring diagram of an electric circuit containing components of the preferred embodiment of my invention.

In its preferred form, the signal controlled adjustable rear view mirror of my present invention as adapted to an automotive vehicle preferably comprises, in combination with an automotive vehicle equipped with an electrical circuit containing a first pair of directional signal lamps mounted on the left front and left rear of the vehicle and a second pair of directional signal lamps mounted on the right front and the right rear of the vehicle and also equipped with a pivotally mounted directional signal lever connected into said circuit for effecting the energization of said directional signal lamps, a rotatable shaft, an adjustable rear view mirror on said shaft, together with electrically actuable means connected into said electrical circuit and to said shaft for rotating said shaft in response to the movement of said directional signal lever to adjust said rear view mirror and thereby vary the visible area to the rear of the vehicle.

Figure 3:
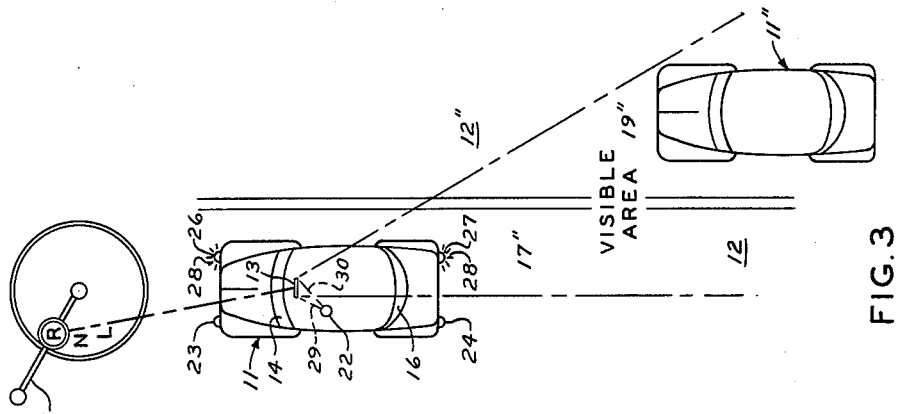
FIG. 3 is a view similar to FIG. 2 but showing the directional signal lever thrown to a position to indicate a right turn, this view illustrating graphically the enlarged visible area to the right rear when the rear view mirror of the vehicle has been automatically moved to its adjusted position for right rear viewing.
Figure 1:
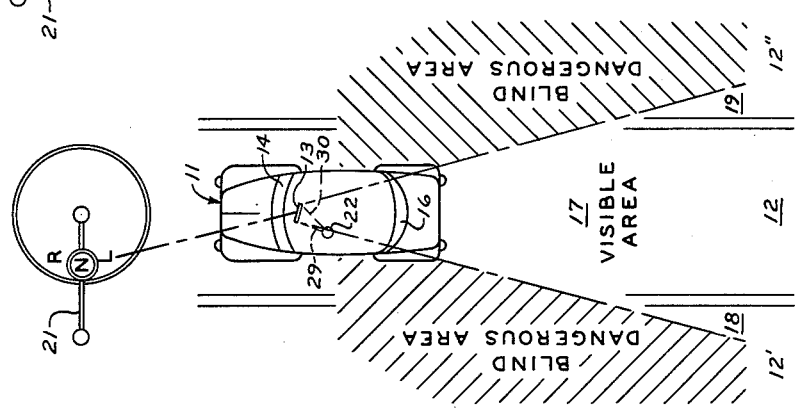
FIG. 1 is a composite schematic plan view of a typical automotive vehicle and a directional signal, with graphic illustrations of areas to the rear of a vehicle which are visible and which are not visible when the vehicle operator views the rear through the conventional rear view mirror of the vehicle.
Figure 2:
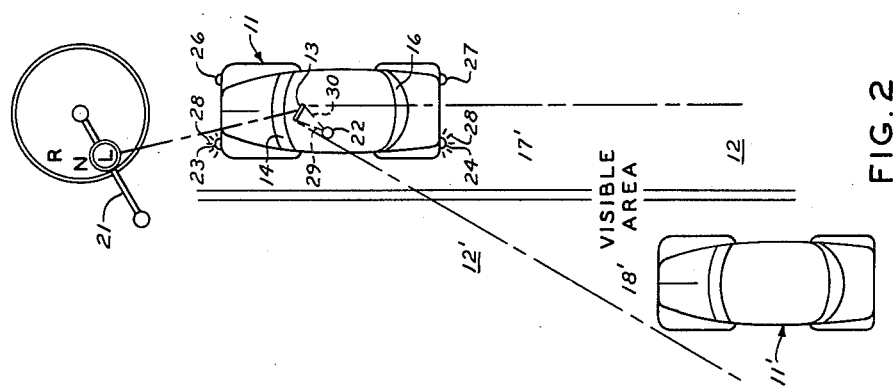
FIG. 2 is a schematic plan view of a preferred embodiment of the invention illustrating one adjusted position of the standard rear view mirror of an automotive vehicle, this view likewise being a composite view of a vehicle with the directional signal lever thrown to indicate a turn to the left, together with a graphic showing of the enlarged visible area to the left rear of the vehicle.

The showings in FIGS. 1–3 inclusive of the annexed drawings are for the purpose of graphically illustrating the efficacy of my present invention when installed upon an automotive or other vehicle using the highways and roads of the country.

FIG. 1 represents a vehicle 11 in a lane 12 of a highway with the rear view mirror 13 of the vehicle positioned in the customary manner for rear vision by the vehicle operator, which is at an angle of approximately 10° to 15° from a position substantially parallel to the windshield 14 or from a position at right angles or normal to the direction of travel along the highway lane 12.

The conventional rear window 16 of the vehicle 11 at such 10° to 15° angle affords a relatively wide visibility directly to the rear of the vehicle not only of the entire width of the lane 12 but visible areas slightly to the left as well as slightly to the right of lane 12 at the rear of the vehicle.

For convenience of explanation, I have applied the legend "Visible Area" to that portion 17 in lane 12 which is directly to the rear of the vehicle and also to those portions 18 and 19 which are visible to the left and to the right, respectively, of lane when the rear view mirror 13 of the vehicle 11 is in its normal or customary position, at approximately a 10° to 15° angle from a position parallel to windshield 14.

In FIG. 1, I have also illustrated schematically a conventional pivotally mounted directional signal lever 21 with which most automotive vehicles are equipped, this view also diagrammatically showing the three positions by legends R, N, and L, to which lever 21 may be thrown or moved by the vehicle operator; it being understood, of course, that such legends indicate right, neutral and left, respectively, and that the lever 21 usually automatically returns to neutral, or position N, after a maneuver of the vehicle has returned the vehicle to straight ahead driving upon the completion of either a left or right turn.

It is further to be understood that upon the automatic return of directional signal lever 21 to the N or neutral position, lights 23 and 24, or lights 26 and 27, as the case may be, go out and the rear view mirror 13 automatically returns to its normal or customary position, as indicated in FIG. 1, under the influence of a return spring hereinafter described, because of the breaking of the electrical circuit.

Of course, on slight turns or maneuvers when the lever 21 does not return to its initial position, the mirror 13 can be returned to its normal position by the shifting of the lever to neutral by the operator.

The directional signal lever 21 normally is pivotally mounted on the steering post, not shown, in the driver's compartment, the driver's position in the vehicle 11 being indicated by the small circle designated by the reference numeral 22 in the views of FIGS. 1, 2 and 3. As is conventional, the directional signal lever 21 is connected into an electrical circuit, not shown in these views but hereinafter described, containing left front and left rear lamps in series with one another, which are schematically shown and designated by the reference numerals 23 and 24, respectively, and also containing right front and right rear lamps 26 and 27 which are connected in series with one another. Suitable interrupting means, not shown, are provided in the electrical circuit to effect a periodic intermittent flashing of these lamps when the directional signal lever 21 is thrown from neutral to the left or right positions thereof.

In FIG. 2, I have shown schematically the adjusted position of rear view mirror 13 when the directional signal lever 21 has been moved to the position designated by the reference character L indicating that the operator of the vehicle 11 has notified oncoming vehicles from the rear, such as the vehicle 11', that he is about to maneuver vehicle 11 out of lane 12 and into the lane 12' at the left. The notification to the operator of the oncoming vehicle 11' that a left turn is about to be made is made by the flashing of signal lights 23 and 24 mounted on the left front and left rear, respectively, of vehicle 11 with the flashing indicated in FIG. 2 by the small ray lines 28 emanating from the lamps 23 and 24. The operator of the oncoming vehicle 11' at the left rear of the vehicle 11 and approaching in lane 12' of the highway immediately to the left of lane 12 of such highway, being apprised by the flashes 28 to the left rear lamp 24 of vehicle 11 that such vehicle is about to make a turn into lane 12' either promptly slows his vehicle 11', which is the safest course to follow, or sounds the siren or horn of his vehicle 11' to notify the operator of vehicle 11 that he should not then safely make the maneuver to the left. Should, however, the flashing of the left rear signal 24 be done in ample time safely to maneuver vehicle 11 from lane 12 to left lane 12', the rear view mirror 13 automatically is adjusted to a greater angle from the position it is normally held, as shown in FIG. 1, so that the vision that the operator of vehicle 11 has to the rear is varied or shifted toward the left. In general, such shifting of mirror 13 on a left maneuver, reduces the direct rear view of lane 12 to approximately one-half of the rear view of such lane when driving straight ahead, and affords the driver rear vision of a much larger portion of the lane at the left, such changed visions being designated by the reference numerals 17' and 18', respectively, and by the dot and dash lines.

In a similar manner, as schematically and graphically depicted in FIG. 3 of the annexed drawings, a driver's rear vision is automatically shifted or varied when he maneuvers vehicle 11 for a turn to the right, or from lane 12 to lane 12" at the right of lane 12. Such shifted rear vision is outlined by the dot and dash lines and by the reference numerals 17" and 19" in FIG. 3 of the drawings to show that on such right turn maneuver, approximately only the right half of lane 12 is visible, as indicated at 17", and a larger portion 19" of the lane 12" at the right is visible to the driver. This shifted rear vision is due to a throw of the directional signal lever 21 from neutral or N position to the position designated by reference character R for a right hand turn. The throw of the lever 21 to position R automatically closes the electrical circuit again, as more particularly hereinafter described, and also by reason of the closing of the circuit automatically adjusts the mirror 13 to a position which presents it substantially parallel to the windshield as well as parallel to the rear window of this vehicle 11. In addition to automatic adjustment of rear view mirror 13, the movement of the directional signal lever 21 automatically will energize the right front and right rear lamps 26 and 27, respectively, for flashing action which will notify the operator of the oncoming vehicle 11" which may be approaching from the rear in lane 12" that the ahead vehicle 11 is about to make a right turn into lane 12" ahead of the oncoming vehicle 11". Accordingly, the right turn maneuver of vehicle 11 can probably safely be made since by observation through his rear view mirror 13, the driver of vehicle 11 can perceive that he has ample space within which the right turn can be made without likelihood of a rear end or side collision of the two vehicles in question.

The graphic illustrations in FIGS. 1, 2 and 3 of the annexed drawings with respect to the visible areas at the rear of a vehicle when operating a vehicle in substantially a straight line, or a turn to the left or to the right, respectively, are predicated on the customary location of the operator's position at the left, as indicated at 22. The lines of vision of the eyes of the vehicle operator from his position at 22 to the rear view mirror 13 are indicated by the short dash lines 29, 30 in all three views. The angles of incidence of the driver's vision in all three instances depicted are defined by the short and long dash lines bounding the areas at the sides which are Visible Areas to the vehicle operator, as delineated in the three views. It is clear that in the case of the normal or customarily adjusted position of rear view mirror 13, and with the directional signal lever 21 in neutral or N position, the rear vision of the vehicle operator is nearly entirely through the rear window 16 of vehicle 11. On the other hand, upon maneuvering the vehicle for left and right turns, with the directional signal lever 21 thrown to the L position or to the R position, the driver's vision to the rear is partially through the rear window 16 of the vehicle and partially through side windows of vehicle 11, not shown.

In accordance with my present invention, I provide means for effectively adjusting the rear view mirror 13 automatically in response to the movement of the directional signal lever 21 to the L position or to the R position upon making a left turn or a right turn, as well as means for automatically returning the rear view mirror to its initial position approximately 10° to 15° from a position normal to the direction of travel in straight ahead driving. These means preferably include a specially constructed crank or shaft 36 which is provided with a ball 37 on its one end and is bifurcated or forked at its other end to provide opposed fingers 38 and 39 thereon in spaced relationship to one another. The ball 37 of crank 36 fits into a socket 41 formed in a boss 42 which projects from the rear or windshield side of rear view mirror 13, see FIG. 7, thereby mounting the mirror 13 for universal movements and permitting tilting of the same up or down as well as the moving of the same to any desired angle in a horizontal plane. The bifurcated end of shaft 36 is arranged so that its opposed fingers 38 and 39 straddle a slidably mounted shaft 43 which projects through a pair of solenoids 46 and 47. The solenoids conveniently may be supported in opposed relationship within a compartment 48 defined by the roof 49 of vehicle 11 and a sloping wall 51 removably secured by means of suitable screws 52 to a bracket 53 as well as an inclined plate 54.

As shown in FIG. 7 and more particularly in FIGS. 4–6 inclusive, the slidably mounted shaft 43 is provided with a pair of projecting clips 63 and 64 on opposite sides thereof which are arranged in opposed and spaced relationship at approximately the longitudinal center of shaft 43, and the bifurcated end of the crank 36 is so disposed that its fingers 38 and 39 are located in the space between the projecting clips 63 and 64 so that one of the clips of each of said pair of clips, say the clips 63, will bear against one side of the shaft or crank 36 on each side of the shaft 43 with the opposed clips on opposite sides, say the clips 64 bearing against the other side of the crank 36. By this arrangement, movement of the shaft 43 axially to the left and to the right will turn or rotate the shaft or crank 36 in bearing bracket 65 secured to plate 54 and, in turn, will cause the rear view mirror 13 to be turned since it is connected to the end 37 of the crank 36. I also provide on slidable shaft 43 a pair of stops 66 and 67 which preferably take the form of nuts which may be threaded onto the shaft 43 in threaded portions 68 and 69 thereof, respectively, to mount the stops 66 and 67 in adjustable spaced relationship to one another. The stops serve to limit the axial movement of the shaft 43 in two directions, since the stops are so mounted that when shaft 43 is moved far to the left, the stop 66 will abut the inner end of the solenoid 46 and when shaft 43 is moved to the right, the nut 67 will abut the inner end of a solenoid 47, thus limiting shaft movement to the left and to the right. The two solenoids 46 and 47 in which the shaft 43 is slidably mounted are conveniently mounted on the horizontally disposed legs 71 and 72, respectively, of a bracket 73 secured to the inclined wall 51 of housing 48.

In accordance with my present invention, the coils of solenoids 46 and 47 are connected into the conventional electrical circuit, see FIG. 8 of the annexed drawings, with which all automotive vehicles are provided when equipped with directional signal lights, the connections being made by means of suitable conductors 76, 77, 78 and 79 in the manner indicated. Such circuit includes the standard battery 81 of the vehicle, from which leads 82 and 83 are extended to the signal lights 23, 24, and 26, 27, respectively, not shown in FIG. 8. The directional signal lever 21 is connected to lead 82 by means of an electrical conductor 84, the lever 21 being pivotally mounted at pivot point 85 so that upon swinging the same to the left and to the right the tip 21' of the lever will engage electrical contacts 86 and 87, indicated also by the reference legends or characters L and R, respectively. A non-electrical contact or neutral point 88, indicated also to the reference character N, is the neutral position of the directional signal lever 21 and its tip 21' when operating the vehicle 11 in a straight path. The modified electrical circuit thus provided may be traced from the positive side of the battery 81, through lead 82 to the signal lights 23, 24, at the left front and left rear of vehicle 11, with take off conductor 84 extending from lead 82 to the pivot pin 85, which is electrically conductive, to the electrically conductive lever 21 which, of course, is sheathed in suitable electrical insulation material in the conventional manner. With lever 21 moved to left contact 86, the circuit is traceable over conductor 76 to the positive side of the coil of solenoid 47 and thence from such coil over conductor 78 to the negative side of battery 81 to complete the circuit for the energization of solenoid 47 and directional signal lights 23 and 24 when maneuvering for a left hand turn. The circuit is completed for a right turn maneuver from lever 21 through right contact 87 of the directional signal unit, thence over conductor 77 to the positive side of the coil of solenoid 46, and thence from the other end of such coil over conductor 79 and conductor 78 to the negative side of the battery 81 whereby the signal lights 26 and 27 at the right front and right rear, respectively, of the vehicle 11 are energized.

Summarizing the control over the movement of the rear view mirror 13 in response to the placement of the lever 21 of the directional signal unit for left and right turns, it will observed that movement of lever 21 to contact 86 energizes solenoid 47 which causes the movement of the shaft 43 to the left. By such axial movement of shaft 43 to the left, the projecting clips 64 will turn the crank or shaft 36 in a clockwise direction so as to likewise turn the rear view mirror 13 to a position, as shown in FIG. 2 which is an increased angular movement from a plane normal to the direction of travel of the vehicle 11 as well as an increased angular relationship to the normal or customary angularly disposed position of such mirror as shown in FIG. 1. The axial movement of shaft 43 is limited by stop 66 which comes into abutment with the inner face of solenoid 46, thus limiting the extent of angular movement of the mirror 13. Upon completion of a left turn maneuver and return to straight ahead driving, the crank or shaft 36 returns to its initial position under the influence of a tension spring 91 which is anchored at its end 92 to the bracket 73 and which is coiled about the shaft 36 as clearly shown in FIG. 7 of the annexed drawings. Upon return of the vehicle 11 to straight ahead driving, the lever 21 of the directional signal unit returns automatically to a neutral position with the tip 21' of the lever engaging non-electrical contact 88 of the unit, see FIG. 8, and the circuit is thus opened. To indicate a right turn maneuver, the lever 21 is moved to place its tip 21' on right contact 87 and the circuit is thus closed from the battery 81 over the conductors 82, 84 and lever 21 and over conductor 77 to energize the left solenoid 46 which effects the movement of the slidable shaft 43 to the right. This axial movement of shaft 43 to the right causes the projecting clips 63 to turn the crank 36 counter-clockwise against the action of its tension spring 91 and likewise turn the rear view mirror 13 from its normal position, as indicated in FIG. 1, to a position which is normal to the direction of travel of vehicle 11, as indicated in FIG. 3 of the annexed drawings. The axial movement of the shaft 43 to the right is limited by the stop 67 which abuts the inner face of solenoid 47, thus limiting the extent to which the rear view mirror can be turned. The angular extent of movement of the rear view mirror 13 can be varied by adjusting the positions of the stops 66 and 67 on slidable shaft 43. This angular extent of movement of rear view mirror 13, in relation to the driver's position 22 can, of course, be varied manually by movement of the mirror 13 on its universal mounting comprising the ball and socket joint 37, 41.

While I have indicated by small plus and minus signs the direction of flow of current in the electrical circuit, diagrammatically depicted in FIG. 8 of the drawings, it is to be understood that the leads 76 and 77 can be interchanged so as to connect the left and right contacts 86 and 87 of the standard directional signal unit to the coils of the solenoids 46 and 47, rather than 47 and 46, respectively, as shown, so that the movement of the shaft 43 will be opposite to that above described, and the movements of other connected parts will be the reverse of those above described. Further, while I have depicted a single unitary shaft 43 supported within the two solenoids 46 and 47 for slidable movement, it is within the purview of the present invention to provide two shafts with control of movement of each shaft independently by one of the solenoids. Other equivalent means can be employed for other components of the combination, all within the purview and scope of the appended claims.

It is clear from the foregoing description and the views of the annexed drawings that my signal controlled adjustable rear view mirror for automotive vehicles affords a unique and desirable safety device which appreciably reduces if not eliminates entirely the likelihood of automobile collisions to the sides and rear. Heretofore, motorists depended to a large extent upon the sense of hearing to detect other vehicles in blind areas to the sides and to the rear without turning the head. However, since the improvement generally in most vehicles including quiet or additional mufflers, excellent insulation against noise, streamlining as well as the improvement in road surfaces, the motorist has had more and more to rely upon vision. Older motorists become involved in accidents because of their inability to rotate their head to look to the side and to the rear. Those motorists who wear corrective lenses have great difficulty if they rotate their heads quickly to look to the rear because the centrifugal action on the lens will shift the same and upon returning their heads to straight ahead viewing, the shifted lens causes blurred vision. Even the young and most alert vehicle operators have had rear end collisions with cars in front because in the fraction of a second taken to turn the head to glance to the right rear or left rear, which are blind areas insofar as present rear view mirrors are concerned, the vehicle in front may be slowed or braked to a stop and the operator who has glanced to the rear finds himself colliding with the slowing or stopped vehicle in front. The reaction interval of turning the head and looking to the side and rear and returning the head for forward vision, in other words, is not short enough in congested highway travel at the present time. By virtue of my present invention, the operator of a vehicle equipped with my signal controlled adjustable rear view mirror does not have to turn his head the slightest degree. He merely raises his eyes to the automatically adjusted rear view mirror as he throws the directional signal lever, and the mirror is presented to his eyes in exactly the proper position for a clear vision through part of the rear window of the car and part of the side window, left or right, depending on whether the maneuver is to the left or right.

It is to be understood that the appended claims are to be accorded a range of equivalents commensurate in scope with the advances made over the prior art.

I claim:

1. A signal controlled adjustable rear view mirror comprising, in combination with a vehicle equipped with an electrical circuit and also equipped with a directional signal lever connected into said circuit for closing and opening the same and with a first pair of signal lamps on the left front and left rear of the vehicle connected in series into said electrical circuit and a second pair of signal lamps on the right front and right rear of the vehicle connected in series into said electrical circuit; said lamps being selectively energized in pairs upon the selective throw of said lever to close said electrical circuit, a rotatably mounted shaft, a rear view mirror on said shaft for rotation therewith whereby the angular relation of said rear view mirror to the direction of travel of said vehicle may be shifted in response to the selective throw of said directional signal lever, a pair of solenoids connected into said electrical circuit; said solenoids being selectively energized in response to the selective throw of said directional signal lever, a solenoid shaft slidably mounted in said pair of solenoids for axial movement to and fro in response to the energization of said solenoids, and means on said solenoid shaft engageable with said rotatably mounted shaft to effect rotation thereof clockwise and counter-clockwise in response to the throw of said directional signal lever thereby angularly to shift said rear view mirror automatically.

2. A signal controlled adjustable rear view mirror as defined in claim 1, and means for automatically returning said rotatably mounted shaft and said rear view mirror to their initial predetermined positions upon the opening of said electrical circuit.

References Cited by the Examiner

UNITED STATES PATENTS

| 1,420,145 | 6/22 | Rees. | |
| 1,572,038 | 2/26 | Reinheimer. | |
| 1,887,706 | 11/32 | Bettman | 88—77 |
| 1,913,874 | 6/33 | Folberth et al. | 88—93 |
| 2,330,444 | 9/43 | Park | 88—93 |
| 2,504,387 | 4/50 | Pruellage | 88—98 |
| 2,519,472 | 8/50 | Howard | 340—73 |
| 2,607,881 | 8/52 | Anderson. | |
| 2,718,175 | 9/55 | Gim. | |
| 2,854,892 | 10/58 | Stark | 88—93 |
| 2,860,545 | 11/58 | Herr et al. | 88—97 X |
| 2,988,957 | 6/61 | Kotora | 88—97 X |
| 3,005,384 | 10/61 | Baird et al. | 88—98 |
| 3,026,771 | 3/62 | Knowlton et al. | 88—77 |

NEIL C. READ, *Primary Examiner.*

JEWELL H. PEDERSEN, *Examiner.*